(12) United States Patent
Rao

(10) Patent No.: US 10,297,126 B2
(45) Date of Patent: May 21, 2019

(54) PRIVACY MASKING VIDEO CONTENT OF ALARM EXCEPTIONS AND MASK VERIFICATION

(71) Applicant: Manjuprakash R. Rao, Bangalore (IN)

(72) Inventor: Manjuprakash R. Rao, Bangalore (IN)

(73) Assignee: Sensormatic Electronics, LLC, Boca Raton, FL (US)

( * ) Notice: Subject to any disclaimer, the term of this patent is extended or adjusted under 35 U.S.C. 154(b) by 252 days.

(21) Appl. No.: 14/932,243

(22) Filed: Nov. 4, 2015

(65) Prior Publication Data

US 2017/0076572 A1 Mar. 16, 2017

(30) Foreign Application Priority Data

Sep. 16, 2015 (IN) .......................... 2926/DEL/2015

(51) Int. Cl.
*G08B 13/196* (2006.01)
*H04N 19/167* (2014.01)
*H04N 19/46* (2014.01)
*H04N 19/30* (2014.01)
*H04N 19/132* (2014.01)
(Continued)

(52) U.S. Cl.
CPC ... *G08B 13/19686* (2013.01); *G06K 9/00771* (2013.01); *H04N 5/77* (2013.01); *H04N 5/91* (2013.01); *H04N 19/132* (2014.11); *H04N 19/167* (2014.11); *H04N 19/17* (2014.11); *H04N 19/187* (2014.11);
(Continued)

(58) Field of Classification Search
CPC .............. G08B 13/19686; G06K 9/46; G06K 2009/4666; H04N 19/167; H04N 19/46; H04N 5/91; H04N 19/132; H04N 19/17; H04N 19/187; H04N 5/77; H04N 19/30
See application file for complete search history.

(56) References Cited

U.S. PATENT DOCUMENTS 6,509,926 B1 * 1/2003 Mills .................. G08B 13/1968
348/143
2005/0129272 A1 * 6/2005 Rottman ............ G06K 9/00228
382/103
(Continued)

OTHER PUBLICATIONS

Hiding Privacy Information in Video Surveillance System.*
Wei et al. "A Hybrid Scheme for Authenticating Scalable Video Codestreams". (Year: 2014).*

*Primary Examiner* — Zhihan Zhou
(74) *Attorney, Agent, or Firm* — Fox Rothschild LLP; Robert J. Sacco; Carol E. Thorstad-Forsyth

(57) ABSTRACT

Systems (100) and methods (300) for selectively controlling privacy masking of image and/or video content. The methods involve: performing privacy masking operations by a privacy masking component to encode at least one first captured image or first captured video with first privacy masking features obscuring privacy sensitive areas of the first captured image or first captured video; detecting an arming of an intrusion detection system or an alarm condition; and communicating a message to the privacy masking component for overriding the privacy masking operations such that at least one second captured image or second captured video is not encoded with second privacy masking features during a certain period of time, in response to the arming of an intrusion detection system or the detection of the alarm condition.

15 Claims, 7 Drawing Sheets

(51) Int. Cl.
*H04N 19/17* (2014.01)
*H04N 19/187* (2014.01)
*H04N 5/77* (2006.01)
*H04N 5/91* (2006.01)
*G06K 9/00* (2006.01)

(52) U.S. Cl.
CPC ............ *H04N 19/30* (2014.11); *H04N 19/46* (2014.11); *G06K 2209/15* (2013.01)

(56) References Cited

U.S. PATENT DOCUMENTS

| | | | |
|---|---|---|---|
| 2006/0064384 A1* | 3/2006 | Mehrotra | G01S 3/7864 |
| | | | 705/57 |
| 2008/0211903 A1* | 9/2008 | Davey | G06K 9/00771 |
| | | | 348/39 |
| 2010/0149330 A1* | 6/2010 | Salgar | G08B 13/19686 |
| | | | 348/143 |
| 2012/0236935 A1* | 9/2012 | Dutt | H04N 19/176 |
| | | | 375/240.03 |
| 2014/0152815 A1* | 6/2014 | Huang | H04N 21/4542 |
| | | | 348/143 |

\* cited by examiner

PRIVACY MASKING VIDEO CONTENT OF ALARM EXCEPTIONS AND MASK VERIFICATION

BACKGROUND OF THE INVENTION

The present disclosure relates to a video system. More particularly, the present disclosure concerns systems and methods for privacy masking video content of alarm exceptions and mask verification.

Presently, requirements exist for implementing privacy masking of identity revealing portions of video content in Closed-Circuit TV ("CCTV") recordings. In this context, the obscuration of face Region of Interest ("ROI") is one of the care-abouts for video systems (e.g., cameras and video recorders). There have been several solutions proposed in prior art wherein the techniques of privacy masking the video content in a given ROI can be implements. Only authorized users can view unmasked content.

SUMMARY OF THE INVENTION

This disclosure concerns implementing systems and methods for selectively controlling privacy masking of image and/or video content. The methods involve performing privacy masking operations by a privacy masking component to encode at least one first captured image or first captured video with first privacy masking features (e.g., image blurring). The privacy masking features obscure privacy sensitive areas of the first captured image or first captured video. Thereafter, an arming of an intrusion detection system or an alarm condition is detected. The alarm condition may be associated with an intrusion into a facility, unauthorized removal of an item from the facility, or an actual or potential crime being committed within or in proximity to the facility. In response to the arming of an intrusion detection system or the detection of the alarm condition, a first message is communicated to the privacy masking component for overriding the privacy masking operations such that at least one second captured image or second captured video is not encoded with second privacy masking features during a certain period of time. When the intrusion detection system is disarmed or the alarm condition is terminated, a second message is communicated to the privacy masking component for causing the privacy masking component to once again perform the privacy masking operations such that at least one third captured image or third captured video is encoded with third privacy masking features.

In some scenarios, the privacy sensitive areas represent at least one of a physical attribute of a person, a license plate and an access point to a certain area of a facility. Boundary co-ordinates of the privacy sensitive areas are inserted as metadata of the first captured image or video.

In those or other scenarios, the methods also involve analyzing regions of the first captured image or video to determine if the first privacy masking features are compliant with privacy masking requirements. The analyzing may comprise (a) analyzing the privacy sensitive areas to determine if each privacy sensitive area contains only privacy marked imagery or (2) analyzing an extent of blurriness of the first privacy masking features to determine if the first privacy masking features are compliant with the privacy masking requirements.

In those or yet other scenarios, the methods further involve: decoding at least a portion of the first captured image or first captured video; and generating a re-encoded image and/or video by re-encoding the decoded portion of the first captured image or first captured video without adding privacy masking features thereto. At least one of the second captured image, the second captured video, the re-encoded image and the re-encoded video is communicated to a remote computing device.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
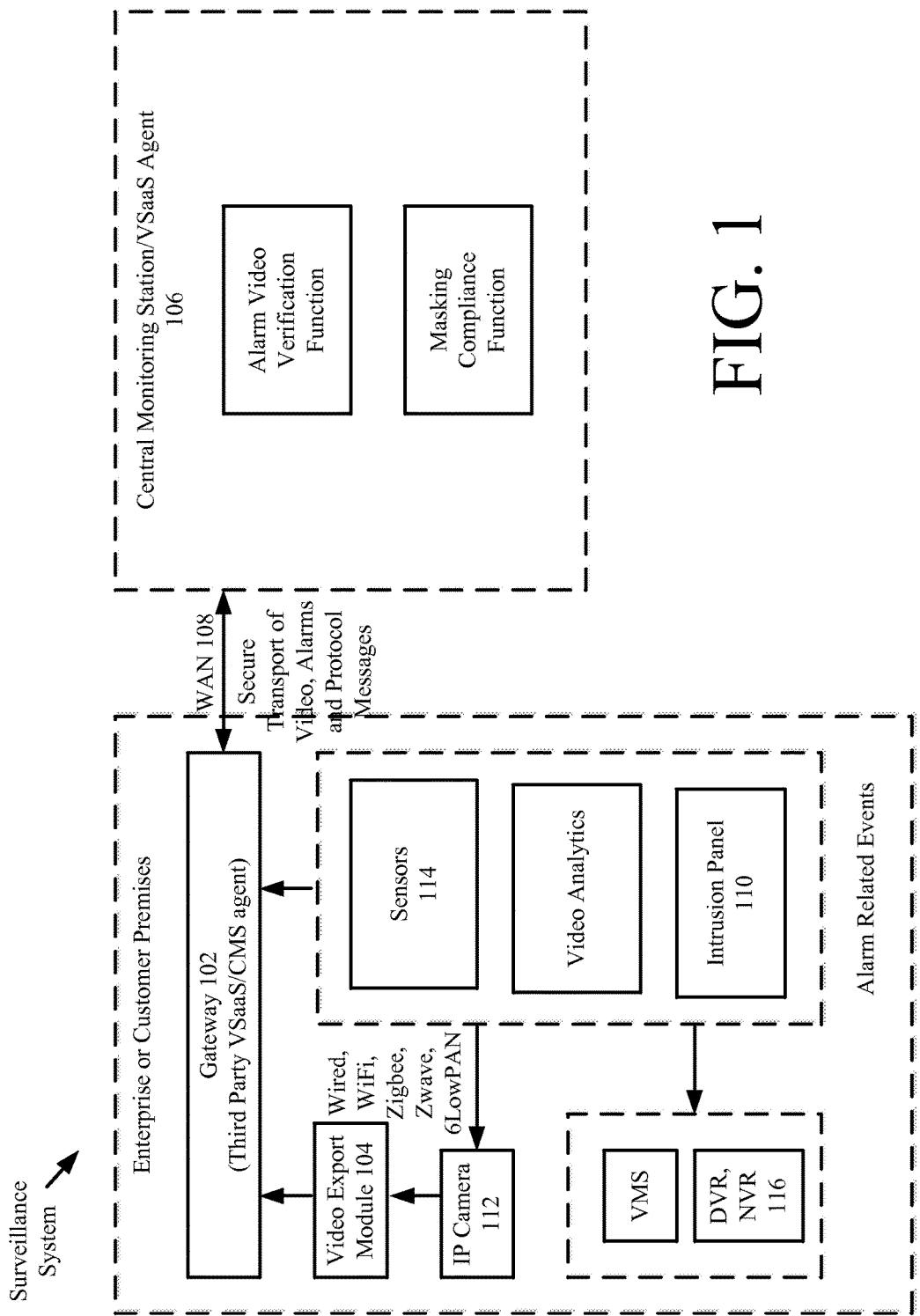
FIG. 1 is an illustration of an exemplary architecture for a surveillance system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Prior solutions have addressed masking of privacy information wherein (a) certain areas of video can be masked and (b) only certain privileged users can unmask and display the original content in the video. In the context where video clips corresponding to alarms are generated by a number of sensors, there are requirements that the video clips be exported to third party video verification and monitoring services. There are applications where the system performance can be improved by disabling the masking functions on a dynamic basis. The masking of privacy revealing aspects of the video will have to be audited from time to time in order to meet compliance requirement. Prior art solutions have not addressed these requirements.

Accordingly, the present disclosure concerns systems and methods for: (a) implementing privacy masking functions in case of alarms and exception events from various sensors when combined with the video feeds; and (b) verifying the compliance of video regions as per configured privacy masking requirements. The following discussion assumes that detected faces or other configured ROI in video frames are masked by appropriate blur filters. The original content is cropped and encrypted using cryptographic algorithms. The resulting video stream contains portions of video which are masked as well as encrypted images corresponding to the masked regions and encrypted security keys. In some scenarios, portions of the resulting video stream are transported using Supplemental Enhanced Information ("SEI") payload option of H.264 encoded streams.

A standard decoder can decode the resulting video streams wherein the displayed content corresponding to the ROIs is masked out. Those video decoders (which are configured with appropriate decryption keys and algorithms) are able to display the original content.

Referring now to FIG. 1, there is provided an illustration of an exemplary architecture for a surveillance system that is useful for understanding the functions thereof. It is quite common for enterprises (such as retail stores) to use video recording or CCTV equipment for surveillance. Some enterprises use intrusion alarm systems and anti-theft systems for Electronic Article Surveillance ("EAS") purposes. In some enterprises, it is important that certain privacy revealing features in video content be masked. The privacy features could be certain features which can uniquely identify a person or a customer. Such information could be face information, license plates of vehicles, etc. There are certain private places in the enterprises that are in the field of view of the camera. The private places will have to be masked in the video feeds for the CCTV to respect the privacy needs of individuals. Hence, it is important that the video feeds containing privacy information be masked. However, there could be certain conditions (as in case of some incidents such as theft) when it will be required to unmask and view the original video content in order to investigate the case. Several enterprises can also avail third party Centralized Monitoring Services ("CMS") or Video Surveillance as a Service ("VSaaS") from companies in order to monitor the alarms. The video equipment used in the enterprises and the CMS operations could be operated on different network domains with different user privileges. CMS operators require video feeds associated with the alarms in order to determine if the alarms are genuine or a false. It is not possible for CMS operators to derive situational intelligence if the face of the persons is masked in the video. A gateway 102 shown in FIG. 1 can request certain specific period of recorded video clips associated with alarm conditions. A CMS agent 106 will retrieve the videos from the video export module 104. The video export module 104 implements the unmasking of the video. The CMS agent 106 optionally encrypts the video and transmits the same over a Wide Area Network ("WAN") 108. Video clients available with CMS operators can have the required functionality to decrypt and view the video.

The process of unmasking the videos requires computation resources and also has latency implications. The present innovation mitigates this using several techniques. In one scenario, ARMed/DisARMed status of an intrusion panel 110 is used to control the video masking function in one or more IP cameras 112. It is usually accepted practice that when a system is ARMed, the enterprise is closed for business and recording the video without masking assists in rapidly (low latencies) creating alarm incident clips in response to requests by CMS operators.

In another scenario, certain sensors or video analytics events in the enterprises can inhibit the masking function in the IP camera 112. For instance, occurrence of an EAS alarm or recognizing a face of a shoplifter by video analytics can be used to inhibit the masking function. The video clips required for verification by CMS operators need to have both pre-alarm and post alarm content. Inhibiting the IP cameras from masking the video during the post alarm period reduces the latencies since only the pre-alarm content has to be unmasked in order to create the video clip of certain duration of video containing both pre-alarm and post-alarm video in unmasked condition.

The present disclosure also describes methods of verifying the compliance of the video regions as per the configured privacy masking requirement. Since enterprises have to demonstrate compliance with respect to protecting privacy of individuals in recorded videos, it is necessary to audit and verify the compliance periodically. Various techniques are described below that are useful for understanding how such compliance requirement can be fulfilled by in an automated method by third party VSaaS platforms.

In some scenarios, the events originate from sensors 114. The events include, but are not limited to, EAS pedestal alarm messages, alarm panel control messages, and/or video analytic events implemented in an on-site or remote server based on the IP camera(s) 112. The events can be relayed over different connectivity means (such as wired or wireless communication links). The connectivity means can include, but are not limited to, a WiFi link, a Zigbee link, a ZWave link, and/or a low power mesh (e.g., 6LowPAN) link. The gateway 102 implements the functions of interfacing with the third party CMS or VSaaS services using an appropriate software or firmware agent. The gateway 102 and the CMS/VSaaS servers communicate with each other over the WAN network. The alarms, images, videos and/or protocol messages are exchanged over the WAN interface. The events are received by the IP camera(s) 112 or DVRs 116 which use these inputs to control the video masking functions. The video export function interfaces with the third party CMS/VSaaS agent. The video export module 104 can provide clips of recorded videos in unmasked condition (for alarms) and masked condition (for audit purposes) based on the type of service request received from the remote CMS/VSaaS servers. The video export module 104 would be configured with the appropriate decryption keys to unmask the video content and re-encode the video content.

The agent is typically implemented on the gateway 102. The gateway 102 performs the function of unmasking the video clips for the required duration and transmits the video to the agent. The gateway 102 can optionally encrypt the video and transport to the CMS/VSaaS services implemented in a remote location. The CMS or VSaaS services implement functions such as video verification services and compliance verification of the masked videos.

Figure 2:
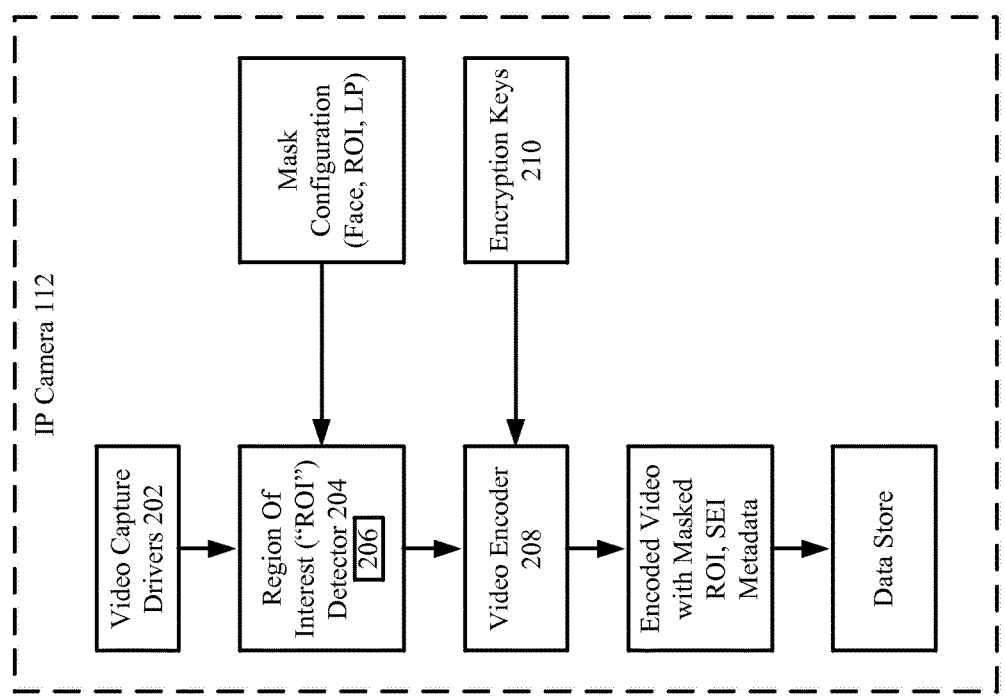
FIG. 2 is an illustration of an exemplary architecture for an Internet Protocol ("IP") camera.

In some scenarios, the video masking process is performed using IP camera 112. A detailed block diagram of the IP camera 112 is provided in FIG. 2. The video frames captured by the video capture drivers 202 are scaled or resized appropriately, as well as provided to a ROI detector 204. The ROI detector 204 includes, but is not limited to, a face detector or a license plate detector. The ROI detector 204 can also be statically configured in the IP camera 112.

A masking function makes a copy of the ROI region. The area with-in the ROI is masked using a blur filter 206. The blur filter 206 repeats the video macroblocks within the ROI which effectively obscures the content. The ROI area information, the video frames with masked content, the original video contents are all input to a video encoder 208.

The video encoder 208 encodes the video frames with masked content in a base layer. The original content without masking can be encoded in the enhancement layer and encrypted using encryption keys 210. The user data fields provisioned in the SEI in the H.264 AVC/SVC standards can be used to convey the metadata. The metadata includes, but is not limited to, ROI boundary coordinates information, flags indicating a presence of encrypted video, and information required to derive decryption keys so that a client devices with appropriate privileges can decrypt and decode the enhancement layer. Client devices without the privileges can decode and display only the base layer which would have masked ROIs in the video content. One such example of privileged client is the video export function.

Figure 3:
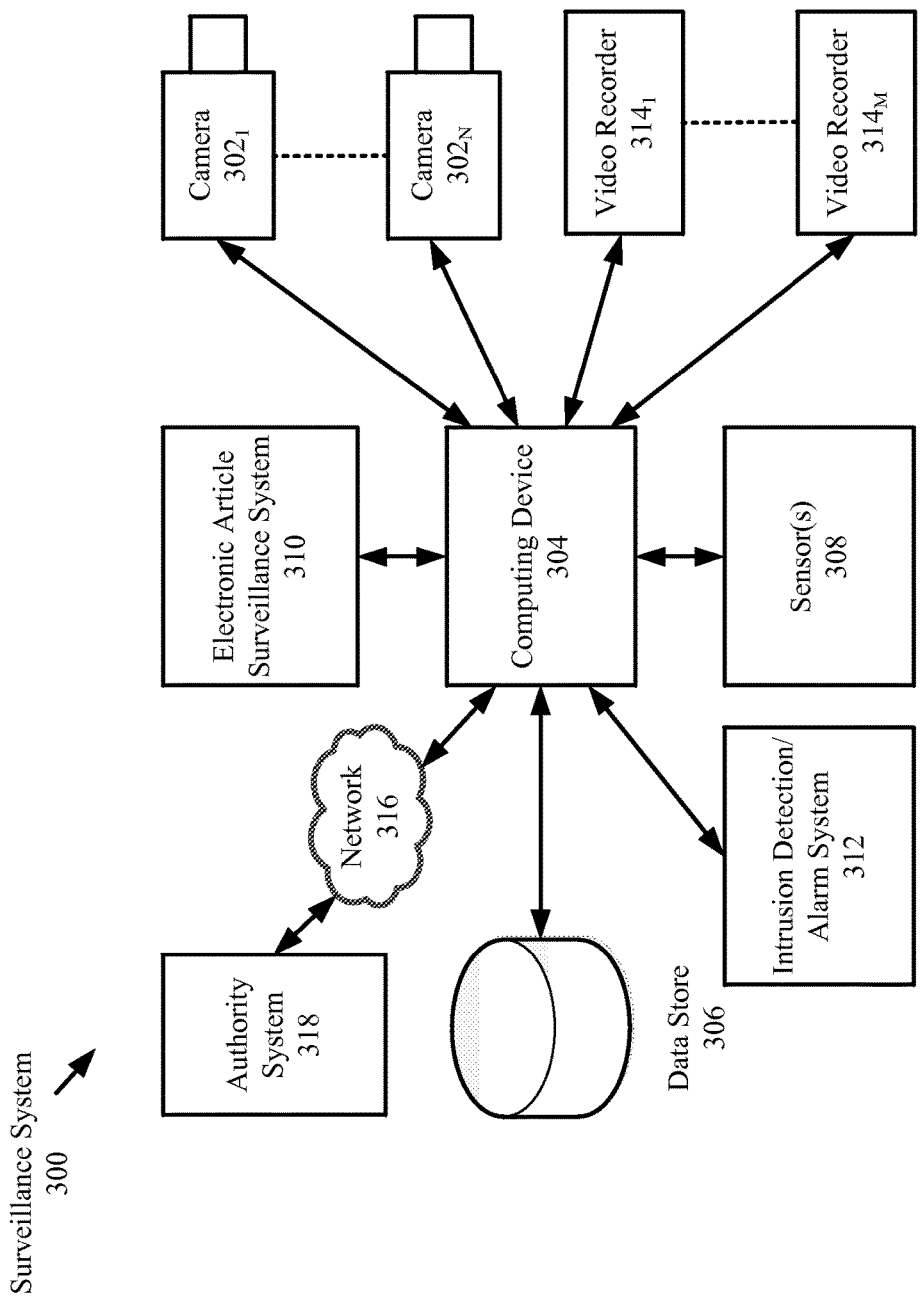
FIG. 3 is an illustration of an exemplary architecture for surveillance system.

Referring now to FIG. 3, there is provided an illustration of an exemplary system 300 that is useful for understanding the present invention. System 300 comprises at least one camera $302_1, \ldots, 302_N$, a computing device 304, a data store 306, at least one sensor 308, an Electronic Article Surveillance ("EAS") system 310, an intrusion detection/alarm system 312, at least one video recorder $314_1, \ldots, 314_M$, a network 316 (e.g., the Internet) and an authority system 318. N and M are integers.

Components $302_1, \ldots, 302_N$, 306-316 are well known in the art, and therefore will not be described in detail herein. Any known or to be known data store, motion sensor, EAS system, intrusion detection/alarm system and/or network can be used herein without limitation provided that such system(s) can detect alarm conditions. Authority system 118 comprises at least one computing device and/or communication device of a remote party (such as the police and/or other emergency responders) who may perform certain actions and/or take certain measures when an alarm condition is detected by the EAS system, intrusion detection/alarm system and/or motions sensor(s).

The video surveillance equipment (e.g., cameras $302_1, \ldots, 302_N$ and/or video recorders $314_1, \ldots, 314_M$) is used in conjunction with sensors 308 which detect motion, intrusion and/or article theft in facilitates (e.g., retail stores). The alarm events from the sensors when combined with the image/video feeds provide situational awareness. The following discussion describes approaches of how alarm events interact with video systems and override (inhibit) default privacy masking operations of surveillance system 300.

During operations, images and/or videos are captured by camera(s) $302_1, \ldots, 302_N$ and/or video recorder(s) $314_1, \ldots, 314_M$. The captured images are processed by the computing device 304 for encoding the same with privacy masking features. The privacy masking features can include, but are not limited to, image blurring. The privacy masking features are located within the image/video so as to obscure privacy sensitive areas thereof. The privacy sensitive areas can include, but are not limited to, areas representing a physical attribute of at least one person (e.g., a person's face), license plates, and/or access points to certain areas of a facility.

In some scenarios, it is desirable to disable the privacy masking operations of the computing device. For example, when a theft is detected, it is advantageous to disable the privacy masking operations so that the thief's face and/or license plate is(are) visible within any captured image and/or video. Accordingly, the computing device is operative to selectively disable the privacy masking operations in response to (1) an arming of the intrusion detection/alarm system 312 and/or (2) a detection of an alarm condition. The alarm condition is detected using sensor data, image data and/or video data. The alarm condition is associated with an intrusion into a facility, unauthorized removal of an item from the facility, and/or an actual or potential crime being committed within or in proximity to the facility. The privacy masking operations are re-enabled when (1) the intrusion detection/alarm system 312 is disarmed and/or (2) the alarm condition terminates.

Figure 4:
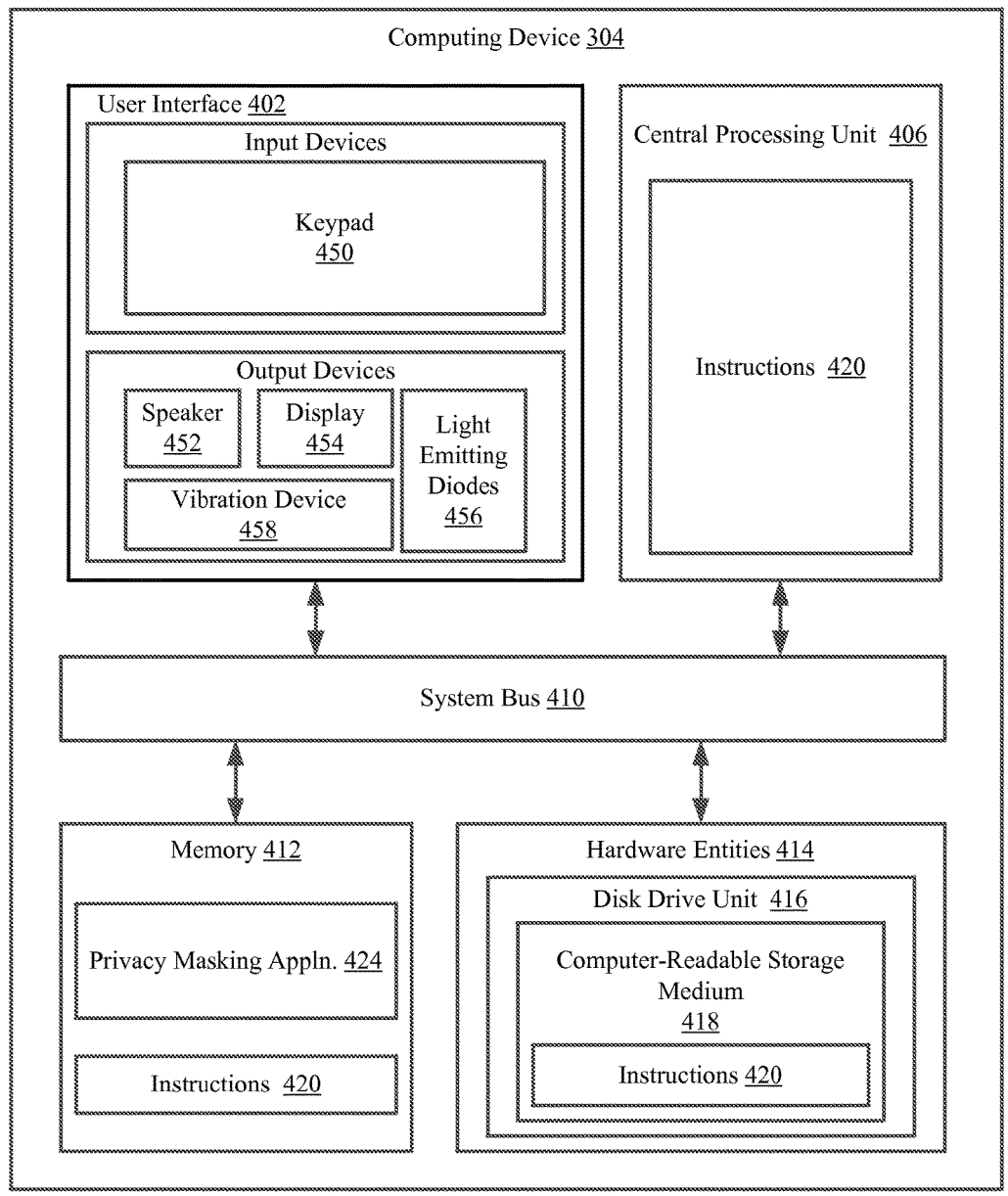
FIG. 4 is an illustration of an exemplary architecture for a computing device.

Referring now to FIG. 4, there is provided a block diagram of an exemplary architecture for the computing device 304 of FIG. 3. Notably, the computing device 304 may include more or less components than those shown in FIG. 4. However, the components shown are sufficient to disclose an illustrative embodiment implementing the present invention. The hardware architecture of FIG. 4 represents one embodiment of a representative computing device configured to facilitate the selective control of privacy masking encoding of images and/or video. As such, the computing device 304 of FIG. 3 implements at least a portion of a method for selectively controlling privacy masking operations in accordance with embodiments of the present invention.

Some or all the components of the computing device 304 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 304 comprises a user interface 402, a Central Processing Unit ("CPU") 406, a system bus 410, a memory 412 connected to and accessible by other portions of computing device 304 through system bus 410, and hardware entities 414 connected to system bus 410. The user interface can include input devices (e.g., a keypad 450) and output devices (e.g., speaker 452, a display 454, a vibration device 458 and/or light emitting diodes 456), which facilitate user-software interactions for controlling operations of the computing device 304.

At least some of the hardware entities 414 perform actions involving access to and use of memory 412, which can be a Random Access Memory ("RAM"), a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 304. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 304 and that cause the computing device 304 to perform any one or more of the methodologies of the present disclosure.

In some scenarios, the hardware entities 414 include an electronic circuit (e.g., a processor) programmed for facilitating the provision of secure communications over a network link. In this regard, it should be understood that the electronic circuit can access and run a software application 424 installed on the computing device 304. The software application 424 is generally operative to facilitate the selective control of privacy mask encoding of images and/or video. In this regard, the software application 424 implements some or all of the privacy masking process described herein.

As noted above, it is generally desirable to protect the privacy of individuals in images and/or video recordings. There are situations in which the images and/or video recordings have to be unmasked and displayed in order to identify persons therein. For example, when an exception alarm or alarm condition is detected by a sensor (e.g., sensor 114 of FIG. 1 or sensor 308 of FIG. 3) installed in a premises, video verification operations are performed in order to determine if the same is a genuine or false alarm. The video verification operations can be implements in a remote location and/or a central location. The on-premises video recording operations could be implemented by a video recorder (e.g., video recorder $314_1$, ..., and/or $314_M$ of FIG. 3) managed locally. Remote monitoring operations may be managed by a separate business entity, and may require video exception clips from on-premises equipment from time to time based on various sensor alarms. The following methods describe approaches of how alarm events interact with image/video systems and override (or inhibit) default privacy masking features.

Figure 5:
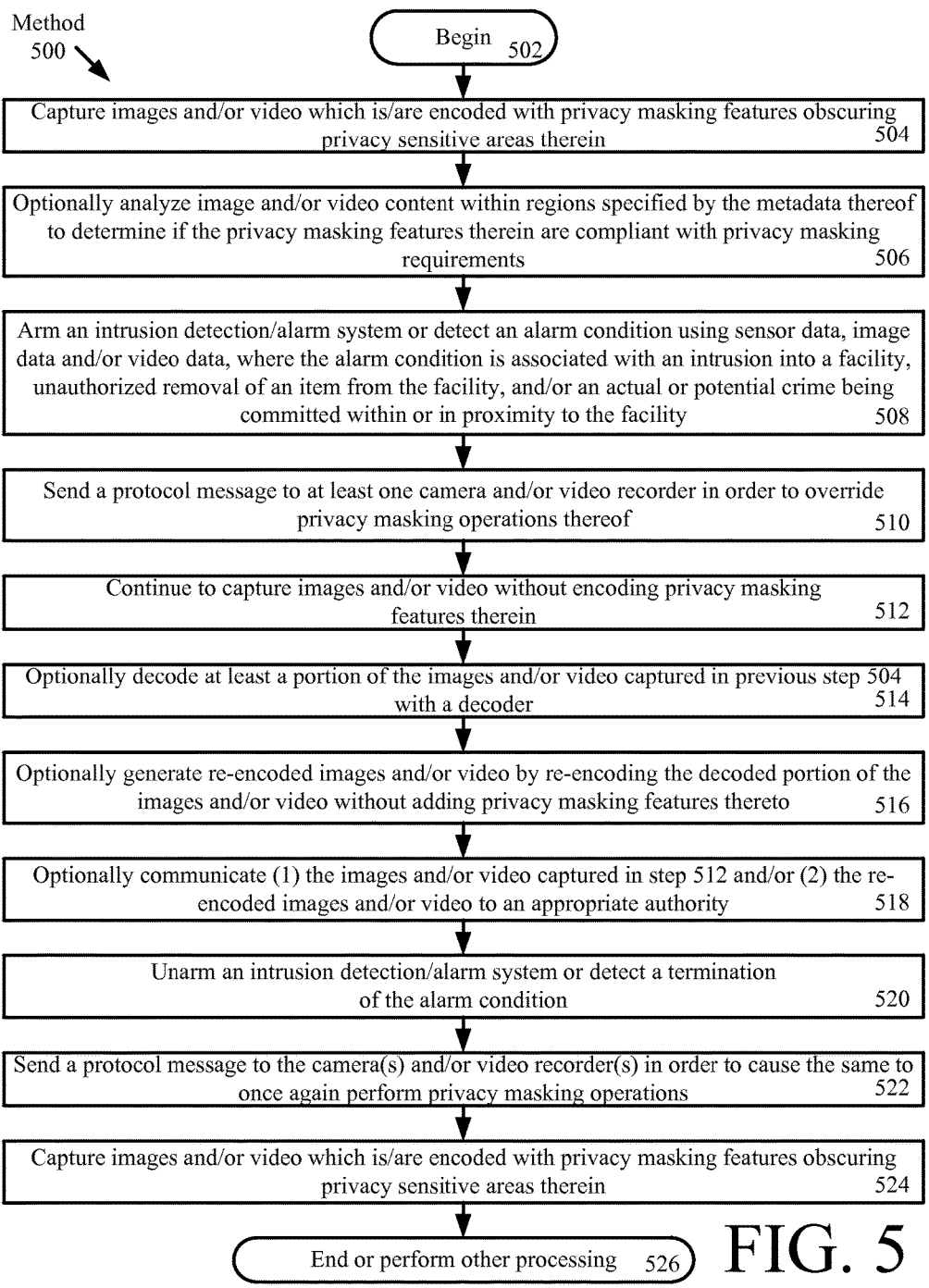
FIG. 5 is a flow diagram of an exemplary method for selectively controlling privacy masking of image and/or video content.

Referring now to FIG. 5, there is provided a flow diagram of an exemplary method 500 for selectively controlling privacy masking of image and/or video content. Method 500 begins with step 502 and continues with step 504 where images and/or video are captured. The images and/or video are captured by at least one camera (e.g., camera $302_1$, ..., $302_N$ of FIG. 3) and/or video recorder (e.g., video recorder $314_1$, ..., $314_M$ of FIG. 3). The captured images and/or video is(are) encoded with privacy masking features that obscure privacy sensitive areas thereon. The encoding of privacy masking features can be performed at a computing device (e.g., computing device 304 of FIG. 3), the camera (e.g., camera $302_1$, ..., $302_N$ of FIG. 3) and/or the video recorder (e.g., video recorder $314_1$, ..., $314_M$ of FIG. 3).

In some scenarios, the privacy masking features can include, but are not limited to, image blurring. The privacy masking features are located within the image/video so as to obscure privacy sensitive areas thereof. The privacy sensitive areas include, but are not limited to, areas representing a physical attribute of at least one person (e.g., a person's face), license plates, and/or access points to certain areas of a facility. The privacy sensitive areas are also referred to herein as "Regions Of Interest ("ROIs")". The ROIs can be specified by a user of a surveillance system (e.g., surveillance system 300 of FIG. 3) via a user interface of a computing device (e.g., computing device 304 of FIG. 3), camera (e.g., camera $302_1$, ..., $302_N$ of FIG. 3) and/or video recorder (e.g., video recorder $314_1$, ..., $314_M$ of FIG. 3). Additionally or alternatively, the ROI configuration can be specified by a user at a central management command centers, and downloaded to the computing device (e.g., computing device 304 of FIG. 3), camera (e.g., camera $302_1$, ..., $302_N$ of FIG. 3) and/or video recorder (e.g., video recorder $314_1$, ..., $314_M$ of FIG. 3). The boundary co-ordinates of the ROIs may be inserted as metadata of the encoded image(s) and/or video.

In a next step 506, regions of the images and/or video content (which are specified by the metadata thereof) are optionally analyzed to determine if the privacy masking features therein are compliant with privacy masking requirements. Compliance to the privacy masking requirements is an important aspect of surveillance in public places or other installations. Obscuration of faces or privacy masking of certain identified areas in the recorded camera feeds (e.g., trial rooms or rest rooms) is important. It may be useful to verify compliance of the ROI masking functions periodically. This could be done manually or automatically. A verification process requires knowledge of ROIs which will have to be masked.

The verification process can be a manual verification process or an automatic verification process. During the manual verification process, a decoder decodes the privacy masking features of the ROIs. The decoder has access to the regions and boundary information for static and dynamic ROIs contained in the metadata of the captured image(s) and/or video. The decoder extracts the region and boundary information from the metadata, and overlays an outline around the privacy masked ROIs. The compliance of the privacy masking is readily verified by viewers who check to see if the ROI with-in an outline contains only masked imagery and/or video.

During the automatic verification process, image/video analytics algorithms are used to analyze image/video content with-in the static and dynamic regions as specified in the metadata. The extent of blurriness in the ROIs is measured to determine if the configured ROIs are compliant with the privacy masking requirements. Blur detection filters essentially measure the presence of high frequency components within the ROI regions. If the images/videos are masked using blur filters at the source, then the high frequency components would be absent and high levels of blurriness would be detected. If the estimated blurriness content is greater than a threshold, then the compliance is categorized as pass or else the image/video is flagged for a manual verification process.

Referring again to FIG. 5, method 500 continues with step 508 where an intrusion detection/alarm system (e.g., instruction detection/alarm system 312 of FIG. 3) is armed or an alarm condition is detected using sensor data, image data and/or video data. In some scenarios, the alarm condition is associated with an intrusion into a facility, unauthorized removal of an item from the facility, and/or an actual or potential crime being committed within or in proximity to the facility. In response to the arming of the intrusion detection/alarm system or detection of an alarm condition, step 510 is performed. In step 510, a protocol message is sent to at least one camera and/or video recorder in order to override privacy masking operations thereof. Thereafter, capturing of images and/or video is continued in step 512, without encoding privacy masking features therein.

Upon completing step 512, optional steps 514-518 may be performed. These steps involve: performing operations by a decoder to decode at least a portion of the images and/or video captured in previous step 504; generating re-encoded images and/or video by re-encoding the decoded portion of images and/or video without adding privacy masking features thereto; and communicating (1) the images and/or video captured in step 512 and/or (2) the re-encoded images and/or video to an appropriate authority.

When the intrusion detection/alarm system is unarmed or the alarm condition terminates, a protocol message is sent to the camera(s) and/or video recorder(s) in order to cause the same to once again perform privacy masking operations, as shown by steps 520-522. As such, images and/or video are once again captured which is(are) encoded with privacy masking features obscuring privacy sensitive areas therein, as shown by step 524. Subsequently, step 526 is performed where method 500 ends or other processing is performed.

In some scenarios, it is desirable that incident images and/or video clips be available in un-masked conditions. There could be third party remote monitoring services (or law enforcement agencies) which require incident images and/or video clips in un-masked conditions in order to derive the best situational awareness.

From an implementation perspective, it is quite straight forward to instruct an encoder to stop masking ROIs corresponding to a configured post-alarm duration. However, the pre-alarm images and/or video are already encoded with privacy masking features. The encoded images and/or video are stored in a data store (e.g., data store 306 of FIG. 3) for a specific pre-alarm duration. The stored images and/or video are decoded to generate un-masked versions thereof when an alarm condition is triggered. The unmasking process generally involves decoding images and/or video with a decoder provisioned to unmask the masked ROIs and then re-encode the same without privacy masking. The resulting process produces contiguous exception images and/or video clips in unmasked conditions for the duration of pre-alarm and post-alarm conditions, which will be made available for exporting into remote monitoring applications. The export function is may be implemented on at least one computing device camera, and/or video recorder.

Figure 6:
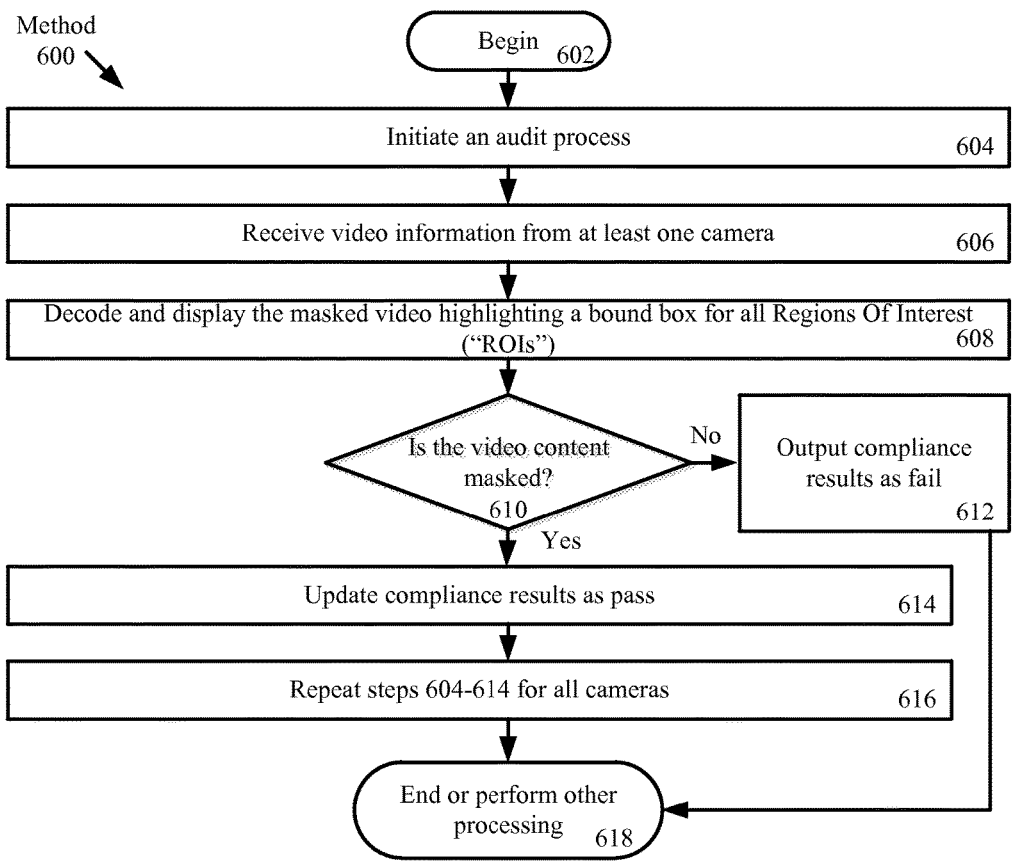
FIG. 6 is a flow diagram of an exemplary method for manual compliance verification.

Referring now to FIG. 6, there is provided a flow diagram of an exemplary method 600 for manual compliance verification. Method 600 begins with step 602 and continues with step 604 where an audit process is initiated. Next in step 606, video information is received from at least one camera. The masked video is decoded and displayed in step 608. The masked video highlights a bound box for the ROIs.

Thereafter, method 600 continues with a decision step 610. Decision step 610 is performed to determine if the video content is masked. If the video content is not masked [610:NO], then step 612 is performed where compliance results are output as fail. Upon completing step 612, step 618 is performed which will be described below. In contrast, if the video content is masked [610:YES], then step 614 is performed where compliance results are updated as pass. Steps 604-614 are repeated for all cameras, as shown by step 616. Subsequently, step 618 is performed where method 600 ends or other processing is performed.

Figure 7:
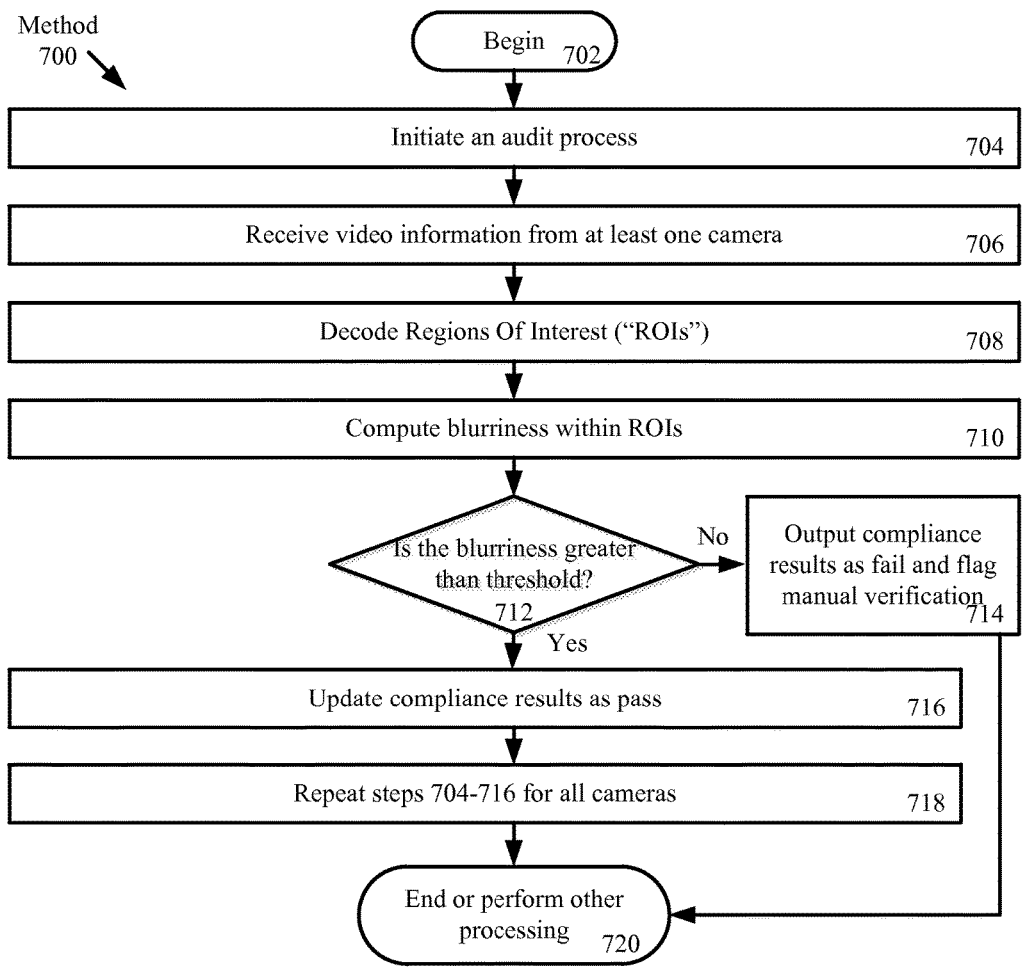
FIG. 7 is a flow diagram of an exemplary method for automated compliance verification.

Referring now to FIG. 7, there is provided a flow diagram of an exemplary method 700 for automated compliance verification. Method 700 begins with step 702 and continues with step 704 where an audit process is initiated. Next in step 706, video information is received from at least one camera. The ROIs of the masked video are decoded in step 708. Then in step 710, blurriness is computed within the ROIs. If the computed blurriness does not exceed a threshold [712:NO], then step 714 is performed where compliance results are output as fail. Manual verification is also flagged in step 714. In contrast, if the computed blurriness does exceed the threshold [712:YES], then step 716 is performed where the compliance results are updated as pass. Notably, steps 704-716 are repeated for all cameras as shown by step 718. Upon completing step 718, step 720 is performed where method 700 ends or other processing is performed.

The audit process ensured that the time instances selected to retrieve video information does not overlap with time periods wherein the privacy mask has been overridden so that the results of the audit compliance process is recorded accurately.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for selectively controlling privacy masking of image and/or video content, comprising:
    performing privacy masking operations by a privacy masking component to encode at least one first captured image or first captured video with first privacy masking features obscuring privacy sensitive areas of the first captured image or first captured video;
    performing operations by a video encoder to generate a bitstream including (1) a base layer bitstream in which video frames with the first privacy masking features are encoded and (2) an enhancement layer bitstream in which an encrypted version of the at least one first captured image or first captured video without privacy masking is encoded;

detecting an event comprising an arming of an intrusion detection system or an occurrence of an alarm condition; and in response to the arming of an intrusion detection system or the detection of the alarm condition, performing the following operations:

communicating a message to the privacy masking component for overriding the privacy masking operations such that at least one second captured image or second captured video is not encoded with second privacy masking features during a certain period of time;

processing the bitstream to decode the enhancement layer bitstream and decrypt the encrypted version of the at least one first captured image or first captured video so as to obtain the first captured image or first captured video without the first privacy masking features obscuring the privacy sensitive areas; and using the first and second captured images or videos to generate a media data stream comprising a plurality of contiguous images or video clips absent of any privacy masking features for a duration of pre-event and post-event conditions.

2. The method according to claim 1, wherein the first privacy masking features comprise image blurring.

3. The method according to claim 1, wherein the privacy sensitive areas represent at least one of a physical attribute of a person, a license plate and an access point to a certain area of a facility.

4. The method according to claim 1, wherein the method further comprises analyzing the privacy sensitive areas to determine if each privacy sensitive area contains only privacy marked imagery or analyzing an extent of blurriness of the first privacy masking features to determine if the first privacy masking features are compliant with the privacy masking requirements.

5. The method according to claim 1, wherein the alarm condition is associated with an intrusion into a facility, unauthorized removal of an item from the facility, or an actual or potential crime being committed within or in proximity to the facility.

6. The method according to claim 1, further comprising communicating at least one of the second captured image and the second captured video to a remote computing device.

7. The method according to claim 1, further comprising communicating a message to the privacy masking component for causing the privacy masking component to once again perform the privacy masking operations such that at least one third captured image or third captured video is encoded with third privacy masking features, in response to a disarming of the intrusion detection system or a termination of the alarm condition.

8. The method according to claim 1, further comprising determining if the first privacy masking features are compliant with privacy masking requirements extracting boundary co-ordinates of the privacy sensitive areas from metadata of the first captured image or video, overlaying an outline around a privacy masked Regions Of Interest ("ROI") defined by the boundary co-ordinates, and determining if a level of blurriness within the ROI is greater than a threshold level.

9. A system, comprising:
at least one processing component, and
a non-transitory computer-readable storage medium in communication with the at least one processing component, the non-transitory computer-readable storage medium comprising one or more programming instructions that, when executed, cause the at least one processing component to (A) perform the following operations prior to a detection of an event comprising an arming of an intrusion detection system or an occurrence of an alarm condition:

privacy masking operations to encode at least one first captured image or first captured video with first privacy masking features obscuring privacy sensitive areas of the first captured image or first captured video;

generating a bitstream including (1) a base layer bitstream in which video frames with the first privacy masking features are encoded and (2) an enhancement layer bitstream in which an encrypted version of the at least one first captured image or first captured video without privacy masking is encoded; and (B) perform the following operations subsequent to the detection of the event:

receive a first message for overriding the privacy masking operations such that at least one second captured image or second captured video is not encoded with second privacy masking features during a certain period of time, process the bitstream to decode the enhancement layer bitstream and decrypt the encrypted version of the at least one first captured image or first captured video so as to obtain the first captured image or first captured video without the first privacy masking features obscuring the privacy sensitive areas; and use the first and second captured images or videos to generate a media data stream comprising a plurality of contiguous images or video clips absent of any privacy masking features for a duration of pre-event and post-event conditions.

10. The system according to claim 9, wherein the first privacy masking features comprise image blurring.

11. The system according to claim 9, wherein the privacy sensitive areas represent at least one of a physical attribute of a person, a license plate and an access point to a certain area of a facility.

12. The system according to claim 9, wherein the following operation is further performed subsequent to the detection of the event: determining whether the first privacy masking features are compliant with privacy masking requirements by analyzing the privacy sensitive areas to determine if each privacy sensitive area contains only privacy marked imagery or analyzing an extent of blurriness of the first privacy masking features to determine if the first privacy masking features are compliant with the privacy masking requirements.

13. The system according to claim 9, wherein the alarm condition is associated with an intrusion into a facility, unauthorized removal of an item from the facility, or an actual or potential crime being committed within or in proximity to the facility.

14. The system according to claim 9, wherein at least one of the second captured image and the second captured video to a remote computing device.

15. The system according to claim 9, wherein the privacy marking component receives a second message for causing the at least one processing component to once again perform the privacy masking operations such that at least one third captured image or third captured video is encoded with third privacy masking features, said second message generated in response to a disarming of the intrusion detection system or a termination of the alarm condition.

* * * * *